United States Patent
Shafe

(10) Patent No.: US 8,387,645 B2
(45) Date of Patent: Mar. 5, 2013

(54) METHODS AND APPARATUS FOR CONTACTING A FLUID STREAM WITH PARTICULATE SOLIDS

(75) Inventor: Peter Shafe, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 274 days.

(21) Appl. No.: 12/981,853

(22) Filed: Dec. 30, 2010

(65) Prior Publication Data

US 2012/0167995 A1 Jul. 5, 2012

(51) Int. Cl.
*F17D 1/16* (2006.01)
*B01J 8/02* (2006.01)

(52) U.S. Cl. .......... 137/13; 137/268; 137/590; 422/211; 422/264; 366/165.2

(58) Field of Classification Search ........... 137/1, 13, 137/590, 591, 268; 422/211, 264; 366/165.2
See application file for complete search history.

(56) References Cited

U.S. PATENT DOCUMENTS

| | | | |
|---|---|---|---|
| 3,409,273 A * | 11/1968 | Kelly | 366/107 |
| 4,414,100 A | 11/1983 | Krug et al. | |
| 4,446,112 A | 5/1984 | Den Hartog | |
| 4,721,603 A | 1/1988 | Krug et al. | |
| 4,747,962 A * | 5/1988 | Smisson | 210/788 |
| 5,158,669 A | 10/1992 | Cetinkaya | |
| 5,181,633 A * | 1/1993 | Weber et al. | 222/195 |
| 5,769,281 A * | 6/1998 | Bates | 222/196 |
| 6,123,833 A | 9/2000 | Sechrist et al. | |
| 6,881,391 B1 | 4/2005 | Sechrist | |
| 7,270,791 B2 * | 9/2007 | Davis et al. | 422/139 |
| 8,152,905 B2 * | 4/2012 | Tuomas | 95/271 |
| 2009/0285732 A1 | 11/2009 | Naunheimer et al. | |
| 2010/0111652 A1 | 5/2010 | Naunheimer et al. | |
| 2010/0125159 A1 | 5/2010 | Naunheimer et al. | |
| 2010/0150668 A1 | 6/2010 | Naunheimer et al. | |
| 2010/0150669 A1 | 6/2010 | Naunheimer et al. | |
| 2010/0152516 A1 | 6/2010 | Naunheimer et al. | |

FOREIGN PATENT DOCUMENTS

| | | |
|---|---|---|
| JP | 08266938 A | 10/1996 |
| JP | 08299780 A | 11/1996 |

* cited by examiner

*Primary Examiner* — Kevin Lee
(74) *Attorney, Agent, or Firm* — Maryann Maas

(57) ABSTRACT

An apparatus and method for contacting a fluid stream with particulate solids are provided. The apparatus comprises a vessel having an upper portion and a lower portion and an inlet for receiving particulate solids and an outlet for discharging the particulate solids. An inner cone is coaxially positioned within an inverted truncated outer cone forming an annulus in the lower portion of the vessel. A truncated conical baffle is disposed within the lower portion of the vessel and at least partially above the inverted truncated outer cone and the inner cone. The truncated conical baffle has a downwardly and inwardly sloping wall with a lower portion thereof overlapping interiorly an upper portion of the inverted truncated outer cone. A plurality of guide tents are spaced apart in the annulus, each guide tent having sloped guide surfaces oriented to guide the flow of particulate solids into the outlet.

20 Claims, 7 Drawing Sheets

METHODS AND APPARATUS FOR CONTACTING A FLUID STREAM WITH PARTICULATE SOLIDS

FIELD OF THE INVENTION

The present invention relates generally to methods and apparatus for processing of fluids and, more particularly relates to methods and apparatus for contacting a fluid stream with particulate solids to substantially eliminate non-flowing particulate solids.

DESCRIPTION OF RELATED ART

Systems for contacting fluid streams with particulate solids are well known and routinely employed in, for example, the processing of gases, the production of chemicals, and the refining of petroleum. The particulate solids typically include catalysts or adsorbents, and the fluid streams are gaseous or liquid mixtures of reactants, products, or streams undergoing processing. For example, numerous hydrocarbon conversion processes can be used to alter the structure or properties of hydrocarbon streams. Generally, such processes include, for example, isomerization from straight chain paraffinic or olefinic hydrocarbons to more highly branched hydrocarbons, dehydrogenation for producing olefinic or aromatic compounds, reformation to produce aromatics and motor fuels, alkylation to produce commodity chemicals and motor fuels, transalkylation, and others. Such processes typically use particulate solids such as catalysts to promote hydrocarbon conversion reactions.

The particulate solids are retained as a moving bed of particulate solids in a vessel of the apparatus through which the fluid stream passes. The particulate solids move through a contacting zone in the vessel in dense gravity driven flow while the processing of the fluid stream is underway. Individual particles rest on each other to make up the bed of particles as opposed to fluidized processes in which an upward flow of gaseous material lifts the particles to permit fluidized transport of particles. Systems continuously or semi-continuously move particles in the dense flow bed, thereby eliminating the need to shut down process equipment in order to change out particles after they have ceased to function due to deactivation or saturation. The particulate solids are retained in the vessel through which the particulate solids and fluids move in a counter-current direction.

In the conventional apparatus for contacting a fluid stream with particulate solids, as illustrated in FIG. 7, the particulate solids flow into an open volume or chamber in a bottom head of the vessel making it difficult for discharge into discrete withdrawal nozzles located externally of the apparatus. In addition, non-flowing particulate solids collect within certain areas of the conventional disengaging vessel, especially in the bottom head thereof, causing plugging in the associated discrete withdrawal nozzles. Exemplary collection areas for non-flowing particulate solids in the conventional vessel are illustrated in FIG. 7 with the non-flowing particulate solids referred to by reference numeral 54 and the flowing particulate solids referred to therein with reference numeral 56. As the catalyst in many processes is a valuable commodity, non-flowing particulate solids impose a direct catalyst cost on the operation of the system. Additionally, plugging of the discrete withdrawal nozzles may stop or slow the flow of particulate solids, forcing the vessel to be opened and cleaned and slowing down operations. Moreover, the fluid stream is conventionally distributed throughout a large cross section of the disengaging vessel, thereby requiring that the vessel tangent length be longer with the volume of particulate solids increased accordingly, resulting in the use of more materials and higher operating costs.

Accordingly, it is desirable to provide an improved method and apparatus for contacting a fluid stream with particulate solids. In addition, it is also desirable to improve the flow of particulate solids and the distribution of the fluid stream through a vessel of the apparatus to substantially eliminate non-flowing particulate solids therein, thereby enabling reduction of the tangent length of the disengaging vessel and the volume of required particulate solids. Furthermore, other desirable features and characteristics of the present invention will become apparent from the subsequent detailed description of the invention and the appended claims, taken in conjunction with the accompanying drawings and this background of the invention.

SUMMARY OF THE INVENTION

An apparatus is provided for contacting a fluid stream with particulate solids having a shear angle. In accordance with one exemplary embodiment, the apparatus comprises a vessel having an upper portion and a lower portion and an inlet for receiving particulate solids and an outlet for discharging the particulate solids. An inner cone is coaxially positioned within an inverted truncated outer cone forming an annulus in the lower portion of the vessel. A truncated conical baffle is disposed within the lower portion of the vessel and at least partially above the inverted truncated outer cone and the inner cone. The truncated conical baffle has a downwardly and inwardly sloping wall with a lower portion thereof overlapping interiorly an upper portion of the inverted truncated outer cone. A plurality of guide tents are spaced apart in the annulus, each guide tent having sloped guide surfaces oriented to guide the flow of particulate solids into the outlet.

An apparatus for contacting a fluid stream with particulate solids having a shear angle and discharging the particulate solids into a plurality of discrete withdrawal nozzles located externally of the apparatus is provided in accordance with yet another exemplary embodiment of the present invention. The apparatus comprises a vessel having an upper portion and a lower portion with an outlet communicating with the plurality of discrete withdrawal nozzles and a contacting zone in the lower portion adapted to contain a volume of the particulate solids. An inner cone is coaxially positioned within a truncated outer cone forming an annulus between the inner cone and the truncated outer cone in the lower portion of the vessel. The inner cone tapers outwardly and downwardly and the truncated outer cone tapers inwardly and downwardly. A truncated conical baffle is secured at an upper end to a wall of the vessel inside the lower portion of the vessel, the truncated conical baffle at least partially above the truncated outer cone and the inner cone and has an inwardly and downwardly sloping wall with a lower portion thereof that overlaps interiorly an upper portion of the truncated outer cone. A plurality of guide tents spaced apart in the annulus, each guide tent having longitudinal guide surfaces for directing flow of the catalyst particles into the outlet. A fluid stream inlet line admits the fluid stream into a contacting zone between the truncated conical baffle and the truncated outer cone. A slope angle of each of the truncated outer cone, the inner cone, the truncated conical baffle, and the plurality of guide tents comprises an angle to vertical equal or less than the shear angle of the particulate solids.

A method for contacting a fluid stream with particulate solids having a shear angle is provided in accordance with yet another exemplary embodiment of the present invention. The method comprises passing particulate solids into a disengaging vessel containing a volume of particulate solids, an inner cone coaxially positioned within an inverted truncated outer cone forming an annulus, a truncated conical baffle at least partially above the inverted truncated outer cone and the inner cone and having a downwardly and inwardly sloping wall with a lower portion thereof overlapping interiorly an upper portion of the inverted truncated outer cone, and a plurality of guide tents spaced apart in the annulus, each guide tent having guide surfaces to guide the flow of the particulate solids into adjacent discrete withdrawal nozzles of a plurality of discrete discharge nozzles. The volume of particulate solids, the inner cone, the truncated conical baffle, and the plurality of guide tents are located within a lower portion of the disengaging vessel. The fluid stream is passed at process conditions into the lower vessel portion for introduction into the volume of particulate solids between the conical baffle and the inverted truncated outer cone. The particulate solids are withdrawn from the vessel through the plurality of discrete withdrawal nozzles.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments contemplated herein are directed to a method and apparatus for contacting a fluid stream with particulate solids. In accordance with an exemplary embodiment, the particulate solids may be spent catalyst particles received from a hydrocarbon conversion zone and subsequently regenerated in a continuous or semi-continuous catalyst regeneration system. The flow of the particulate solids downwardly in a moving bed through a vessel of the apparatus into discrete withdrawal nozzles located externally of the apparatus is improved, thereby substantially eliminating non-flowing particulate solids within the vessel and within the associated discrete withdrawal nozzles. In accordance with another exemplary embodiment, the apparatus is configured to provide faster and better distribution of the fluid stream through the particulate solids. The improved distribution enables a reduction in vessel tangent length resulting in a shorter vessel that is less costly, requiring fewer materials, less upfront costs to operate, easier insulation, and is more space-efficient. In addition, the reduced tangent length reduces the overall volume of the vessel thus reducing the amount of particulate solids needed, thereby also reducing operating costs. As used herein, the term "tangent length" refers to the length between an internal head and a bottom head of the vessel or between a top head and the bottom head of the vessel, depending on the use of the apparatus. As used herein, the term "zone" refers to an area or region of one or more equipment items that is distinguishable in purpose from an adjacent area. An equipment item, such as a reactor or vessel, can include one or more zones or sub-zones.

Figure 1:
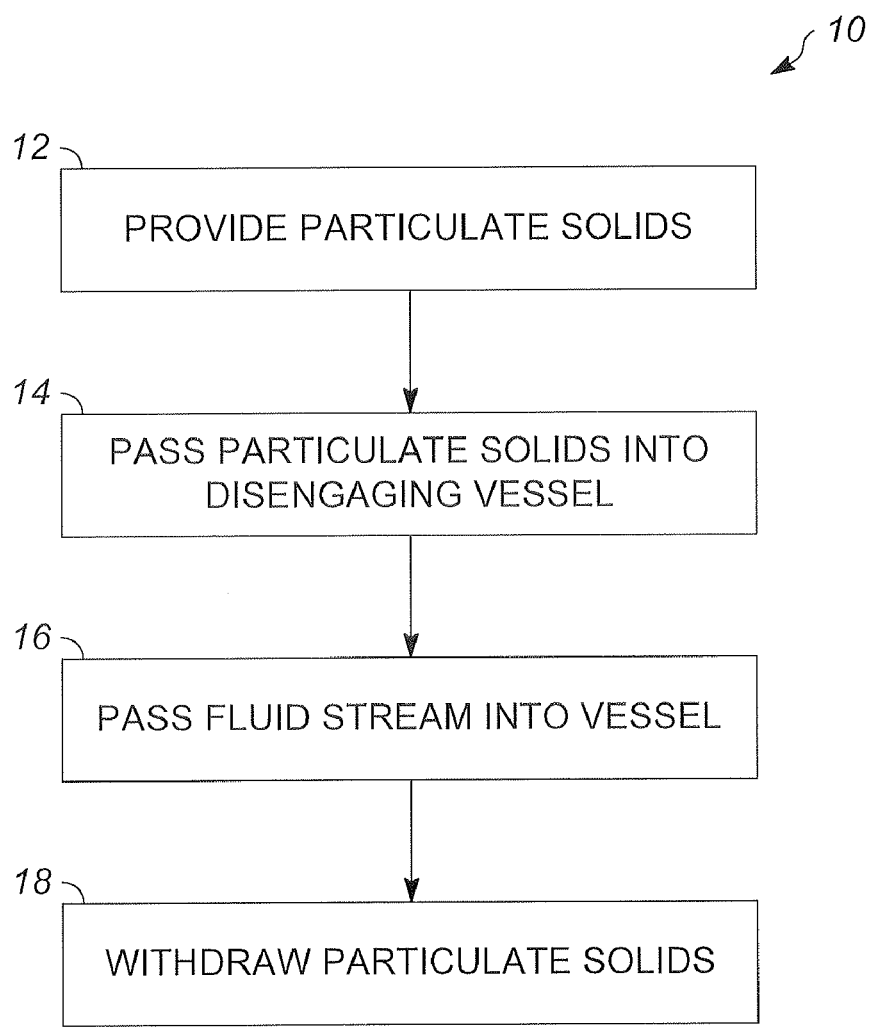
FIG. 1 is a flow chart of a method for contacting a fluid stream with particulate solids according to exemplary embodiments of the present invention.
Figure 2:
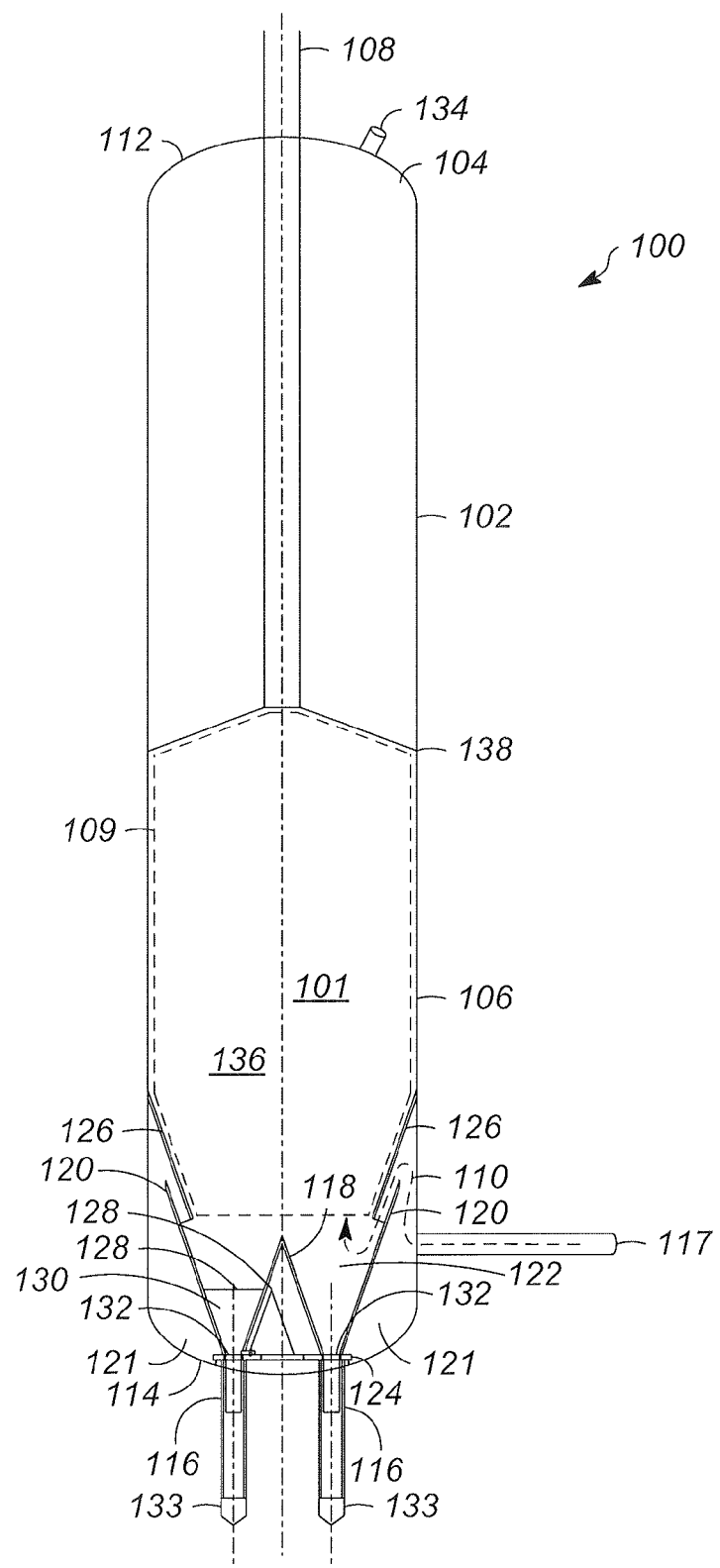
FIG. 2 is a cross-sectional view of an exemplary apparatus, according to exemplary embodiments of the present invention.

Referring to FIGS. 1 and 2, a method 10 for contacting a fluid stream with particulate solids begins by providing particulate solids (step 12). The particulate solids may be in granular or in pelleted form. As used herein, the term "pelleted" is used to refer to particulate solids that are formed into, for example, a sphere or the like. The apparatus described herein is useful for disengaging particulate solids having a shear angle of about 10 degrees to about 45 degrees. As used herein, "shear angle", often referred to as the angle of internal friction, refers to the angle of the solid against solid. It is the angle at which a solid particle will flow on itself in the non-fluidized state. In accordance with an exemplary embodiment, the particulate solids comprise spent catalyst particles containing coke deposits from a hydrocarbon conversion process. Hydrocarbon conversion processes are well known and include, for example, a wide range of catalytic hydrocarbon conversion processes including aromatic isomerization, paraffin or olefin isomerization, paraffin dehydrogenation, alkylation, and the regeneration of the catalyst. Hydrocarbon conversion processes may include reforming, alkylating, dealkylating, hydrogenating, hydrotreating, dehydrogenating, isomerizing, dehydroisomerizing, dehydrocyclizing, cracking, or hydrocracking. Spent catalyst particles from a hydrocarbon conversion process typically have a shear angle of 20° and are in pelleted form, ranging in size from about 1 mm to about 3 mm. The path of the spent catalyst particles to and from the hydrocarbon conversion zone (not shown) is well known.

Referring still to FIGS. 1 and 2, the method 10 continues by passing the particulate solids into a disengaging vessel 102 (hereinafter simply referred to as a "vessel") of an apparatus 100 (step 14). The vessel has an upper portion 104 and a lower portion 106, an inlet 108 for receiving the particulate solids, and a plurality of spaced-apart discharge openings 132 in an annular ring 124 overlying a bottom head 114 of the vessel that communicates with a plurality of discrete withdrawal nozzles 133 located externally of the vessel. The vessel 102 may be generally cylindrical with generally elliptical top and bottom heads 112 and 114, although other shapes may be used. Each discharge opening of the plurality of spaced-apart discharge openings 132 communicates with a corresponding discharge pipe 116 of a plurality of discharge pipes extending through the bottom head 114 of the vessel. The plurality of discharge pipes communicates with the plurality of discrete withdrawal nozzles 133. The vessel may further include a fluid stream inlet line 117 for admitting into the vessel a fluid stream and a line (not shown) through which a gas can leave the vessel after contacting the particulate solids, as hereinafter described.

Figure 3:
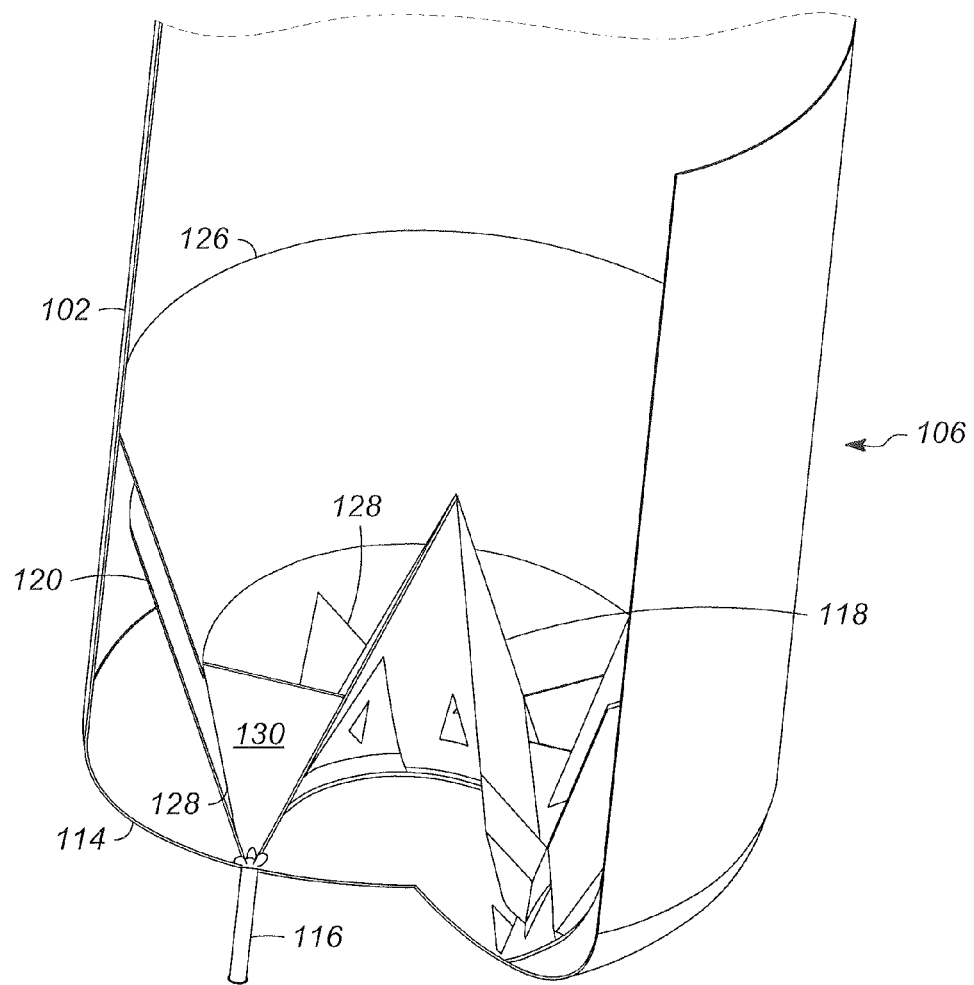
FIG. 3 is a cutaway perspective view of the apparatus of FIG. 2.
Figure 4:
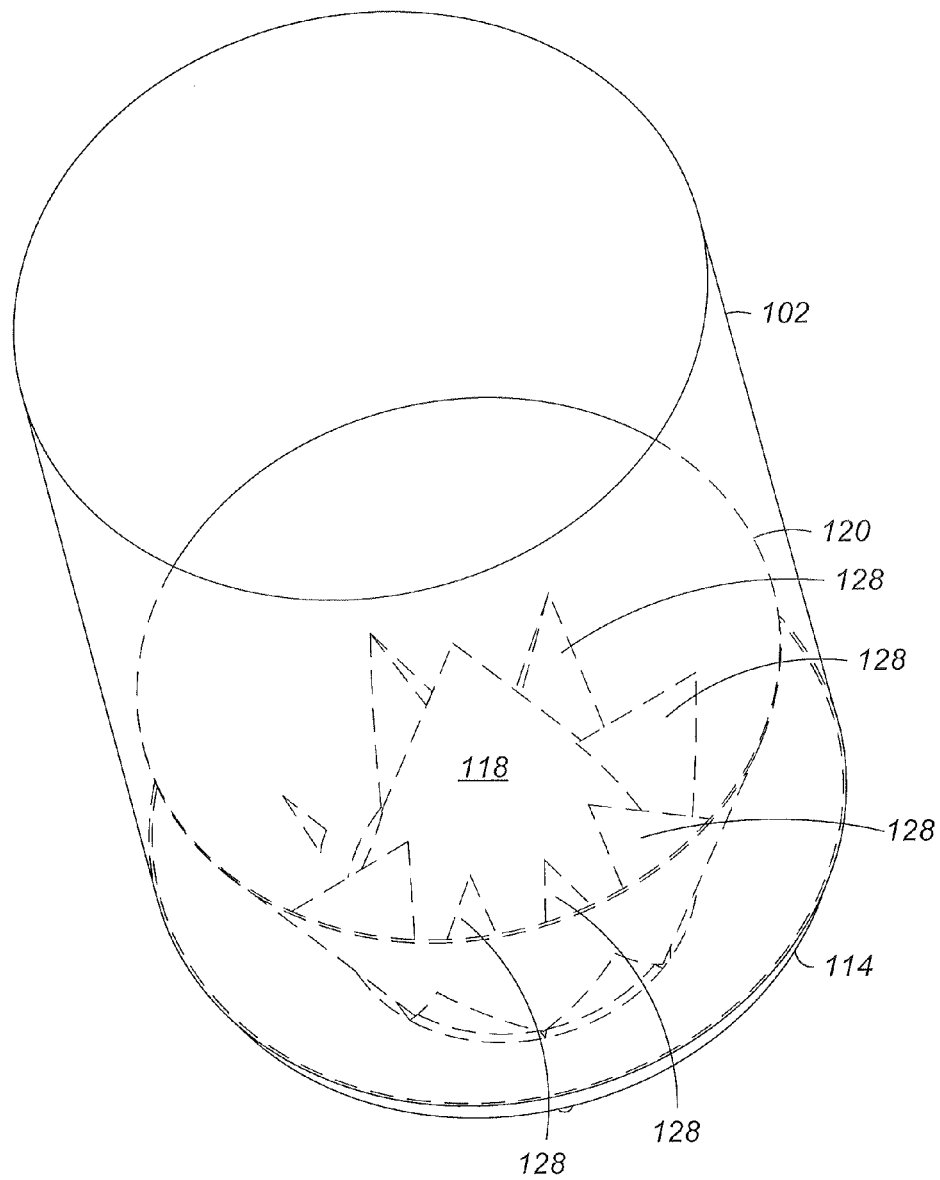
FIG. 4 is a perspective view of a particulate flow assembly within a lower portion of a vessel of the apparatus of FIG. 2.
Figure 6:
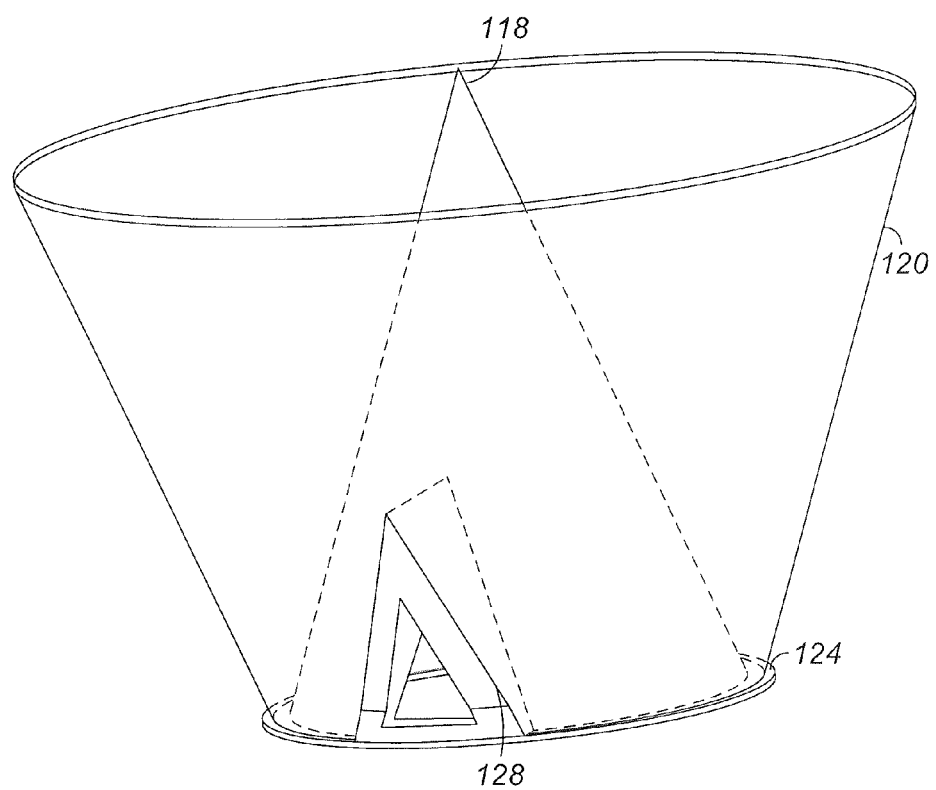
FIG. 6 is a perspective view similar to FIG. 5, illustrating an open bottom of the inner cone of FIG. 2 and the inverted truncated outer cone.

Referring now to FIGS. 2 and 3, within the lower vessel portion 106, an inner cone 118 is coaxially positioned within an inverted truncated outer cone 120 forming a conical annulus 122 in the lower portion of the vessel between the inner cone and the inverted truncated outer cone. The inner cone 118 tapers downwardly and outwardly having its bottom end open (See FIG. 6) and engaged with the annular ring 124 (not shown in FIG. 3). The apex of the inner cone terminates below the top of the outer cone. The inner cone may be separable into sections for cleaning. The inverted truncated outer cone 120 tapers downwardly and inwardly and terminates in an open flat circular bottom that is secured to the annular ring, as hereinafter described (See FIG. 6). The inverted truncated outer cone is open at both ends and does not extend to the peripheral wall of the vessel. The inner cone and the inverted truncated outer cone are concentric right circular cones, i.e., symmetrical about the vertical axis.

Still referring to FIGS. 2 and 3, a truncated conical baffle 126 is disposed within the lower portion of the vessel and above the inner cone 118 and the inverted truncated outer cone 120. The truncated conical baffle 126 has a downwardly and inwardly sloping wall with a lower portion thereof overlapping interiorly an upper portion of the inverted truncated outer cone. The truncated conical baffle is secured at an upper end to the peripheral wall of the vessel in the lower portion of the vessel. As viewed in cross section, the truncated outer cone and the conical baffle are substantially parallel.

Referring now to FIGS. 2 through 5, a plurality of guide tents 128 is spaced apart circumferentially in the conical annulus 122 between the inner and outer cones. Each guide tent is substantially A-shaped having sloped sides forming longitudinal guide surfaces 130 with one end of the guide tent contoured to follow a contour of the truncated outer cone and the opposing end contoured to follow the contour of the inner cone. The ends may be closed or open. The truncated conical baffle is used to direct descending particulate solids away from the peripheral wall of the vessel toward the center of the volume of particulate solids and to an interior surface of the outer cone and the longitudinal guide surfaces. The longitudinal guide surfaces are oriented to guide the flow of the particulate solids into adjacent spaced-apart discharge openings 132 in the annular ring 124. The width of the longitudinal guide surfaces corresponds to the width of the annulus. The top of each guide tent 128 forms an apex that is arranged radially between the inner cone and the inverted truncated outer cone. The slope angle of the inner cone, the inverted truncated outer cone, the conical baffle, and the plurality of guide tents are at an angle that is equal to or less than the shear angle of the particulate solids, preferably equal to the shear angle of the particulate solids. For example, the slope angle of each of the inner cone, the inverted truncated outer cone, the conical baffle, and the plurality of guide tents is preferably 20 degrees to vertical when the shear angle of the particulate solids is 20 degrees. The minimum slope angle is about 5 to about 10 degrees to vertical. The inner cone, the inverted truncated outer cone, the conical baffle, and the plurality of guide tents are collectively referred to herein as a "particulate flow assembly". The walls of the lower vessel portion and the inner surfaces of the conical baffle and inverted truncated outer cone define a contacting zone 109 (shown in dotted lines in FIG. 2) where a portion of the volume of particulate solids is retained and the fluid stream contacts the particulate solids, as hereinafter described. Particulate solids are also retained below the contacting zone, except in annular volume 121, but there is little or no contact with fluid stream in the vessel below the contacting zone. An exemplary contacting zone as illustrated in FIG. 2 is filled with catalyst (not shown) up to an internal head 138. It is to be understood that the catalyst level may be lower in the vessel, thereby decreasing the contacting zone area. However, the center of the contacting zone is occupied by the inner cone which prevents the particulate solids from entering and collecting in the areas where nonflowing particulate solids collect in conventional vessels. As noted previously and as illustrated in FIG. 7, non-flowing particulate solids 54 collect in the bottom head of conventional vessels.

Figure 5:
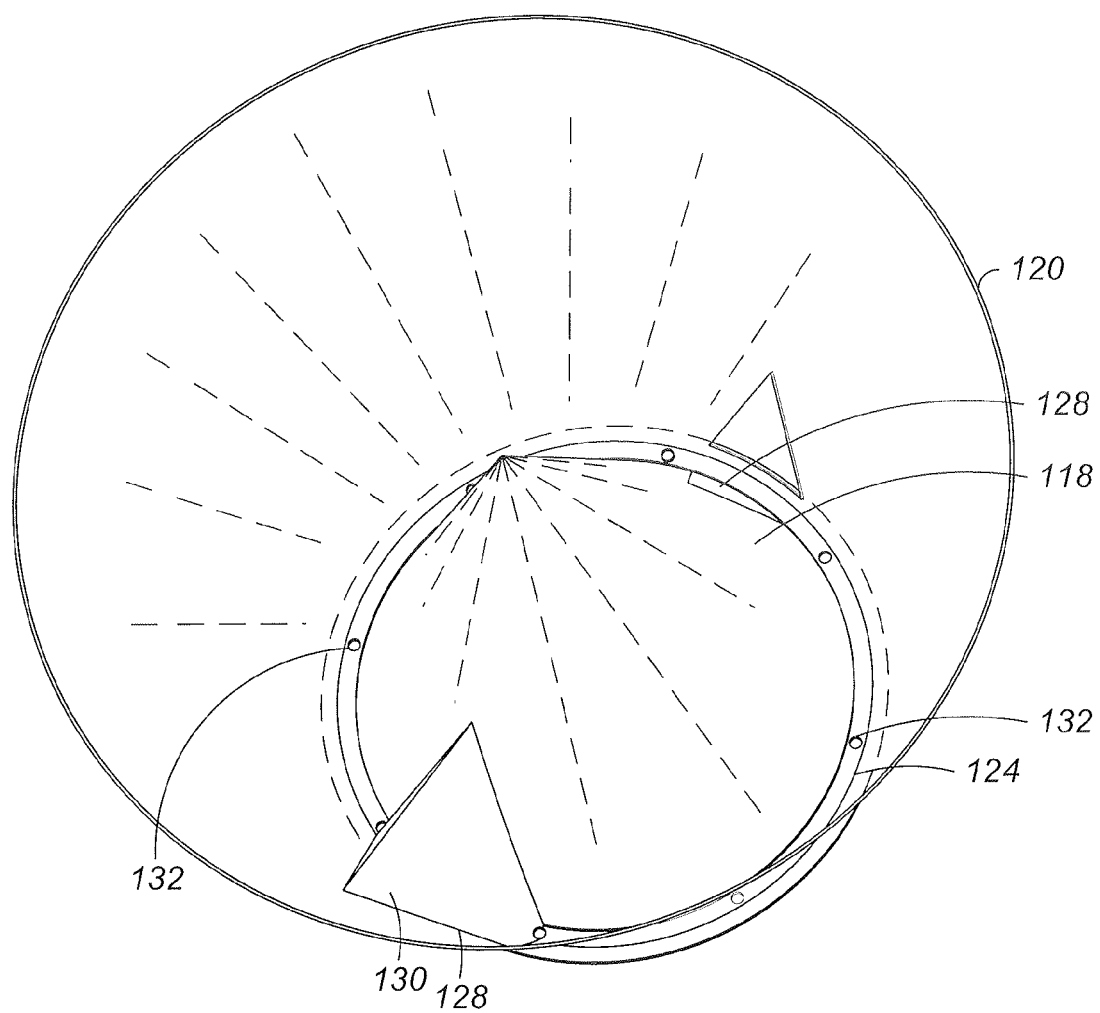
FIG. 5 is a perspective view of the inner cone of FIG. 2 coaxially supported within an inverted truncated outer cone on an annular ring with a guide tent in an annulus formed between the inner cone and the inverted truncated outer cone.

The inner cone 118 and the inverted truncated outer cone 120 are coaxially supported in the lower portion of the vessel on the annular ring 124 overlying the bottom head 114 of the vessel (See FIGS. 2 and 5). The annular ring provides the base for the inner cone, the inverted truncated outer cone, and the plurality of guide tents. Each of these components may be coupled to the annular ring by welding, gluing, riveting, or the like. The annular ring includes the plurality of spaced-apart discharge openings 132 communicating with the plurality of discharge pipes 116 extending from each of the openings through the bottom head of the vessel. The number of spaced-apart discharge openings corresponds to the number of guide tents and the number of discrete withdrawal nozzles 133 and discharge pipes 116. Each discharge pipe communicates with a discrete withdrawal nozzle 133. The discrete discharge nozzles are arranged radially around the bottom head of the vessel. Exemplary discrete withdrawal nozzles are illustrated in FIG. 2. The particulate solids are discharged through the discrete discharge nozzles and passed to the next zone, for example, a catalyst regeneration zone in the case of spent catalyst particles.

Referring again to FIGS. 1 and 2, method 10 continues by passing a fluid stream through the fluid stream inlet line 117 into the lower vessel portion 106 below the conical baffle into an annular volume 121 where there are no particulate solids (step 16 in FIG. 1). The annular volume is defined by the wall of the lower vessel portion and the exterior surfaces of the inverted truncated outer cone and the conical baffle. The fluid stream is introduced into the volume of particulate solids between the conical baffle and the inverted truncated outer cone as shown by the dotted arrow 110 in FIG. 2. The pressure drop through the volume of particulate solids is used to distribute the fluid stream through the particulate solids in the contacting zone 109. While the fluid stream can enter the lower portion of the vessel anywhere below the conical baffle where the pressure is highest and there are no particulate solids (the position of the fluid stream inlet line 117 in FIG. 2 indicates a general, not a specific, position), the fluid stream is introduced into the volume of particulate solids between the conical baffle and the inverted truncated outer cone where the lower portion of the conical baffle overlaps interiorly the upper portion of the inverted truncated outer cone. The introduction area (again indicated by the dotted arrow 110 in FIG. 2) of the contacting zone has a reduced cross section, relative to the entire cross section of the vessel, in which to distribute the fluid stream. The truncated conical baffle also introduces the fluid stream toward the center of the volume of particulate solids in the contacting zone 109. By introducing the fluid stream into the volume of particulate solids between the conical baffle and the inverted truncated cone, i.e., through a smaller cross section and toward the center, the fluid stream is distributed faster and more evenly through the volume of particulate solids than in a conventional apparatus.

Figure 7:
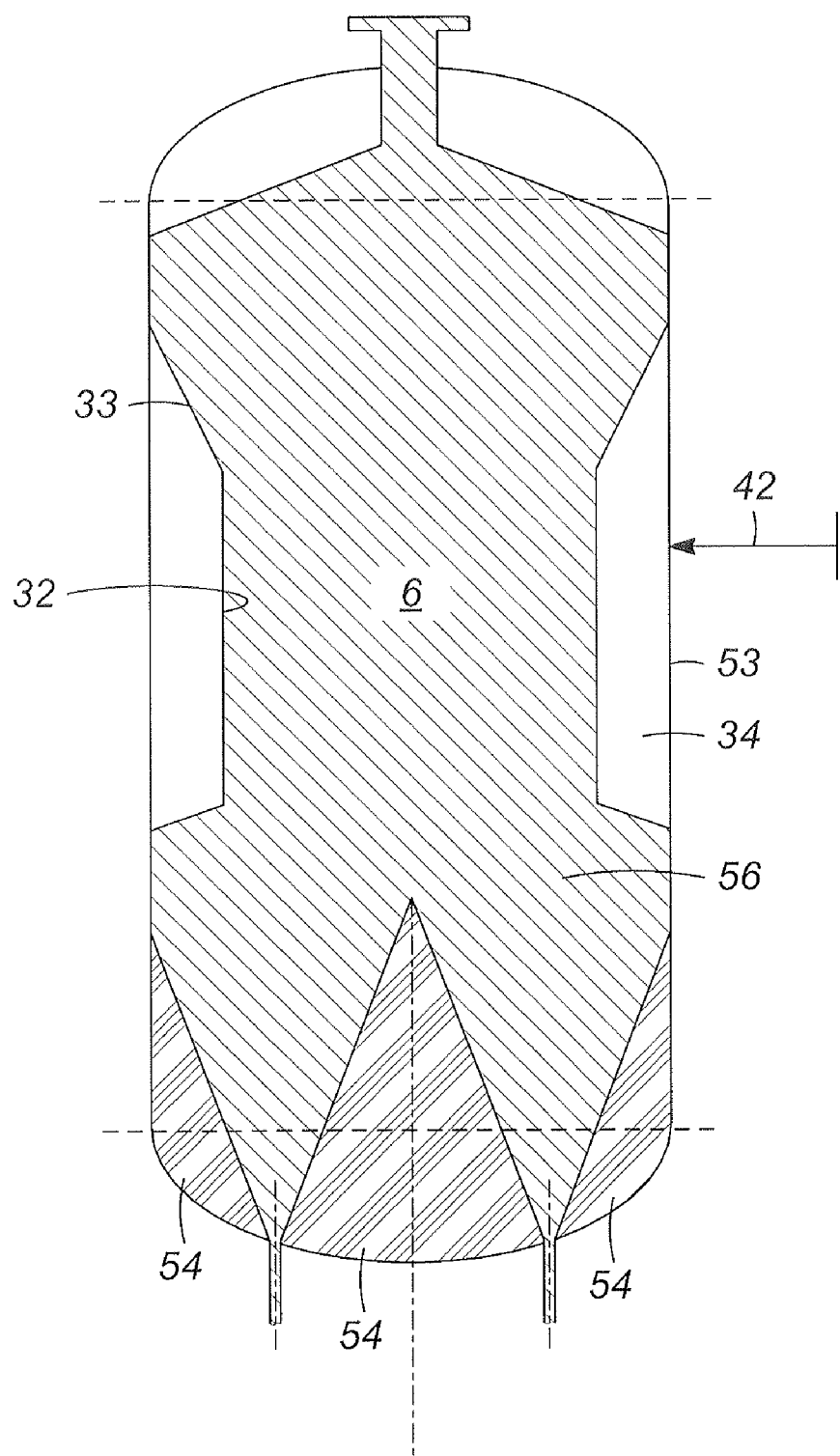
FIG. 7 is a cross-sectional view of a conventional apparatus for contacting a fluid stream with particulate solids.

As noted above, an exemplary conventional apparatus 200 is depicted in FIG. 7 with portions omitted for ease of illustration. In the exemplary conventional apparatus, gas enters a vessel of the apparatus via line 42 into an annular volume 34 that distributes the gas. The annular volume 34 is defined by the wall of lower vessel section 53 and a baffle comprising a vertically extended cylindrical section 32 that is secured to the lower vessel section 53 by a frusto-conical section 33. An open bottom of annular volume 34 allows gas to be distributed about the entire circumference of the annular volume 34 and about a zone 6. Thus, gas is introduced and distributed into a larger cross section of the vessel and near the vessel wall around a constant cross sectional cylindrical baffle, and that cross-section is maintained throughout the entire residence time. Catalyst duration within the contacting zone, referred to as the "residence time", is governed principally by the tangent length between an internal head 138 (FIG. 2) and the bottom head of the vessel or between the top head and the bottom head of the vessel. The volume lost by the conventional cylindrical baffle keeping an annulus around the vessel wall cannot be used for the residence time, and so that volume must be added in extra tangent length in the conventional apparatus. There must be both catalyst and fluid stream in the volume to be counted toward residence time.

The vessel tangent length of apparatus 100 may be reduced from that of conventional apparatus 200 because in removing the cylindrical baffle used for distribution of fluid streams in a conventional apparatus as hereinafter described, the annular volume between the vessel wall and the removed baffle can now be used toward residence time, allowing for a shorter required tangent length to achieve the required volume. Stated another way, the fluid stream is introduced through an area much smaller than the entire vessel cross-section (the narrowest portion of the upper baffle), but is allowed to flow out (along the top of the conical baffle) all the way to the vessel wall at which it is then using the entire cross-section of the vessel to reach the needed residence time. The reduction in tangent length as described herein results in a shorter vessel that is less costly, requiring fewer materials, less upfront costs to operate, easier insulation, and is more space-efficient. In addition, the reduced tangent length reduces the overall volume of the vessel thus reducing the amount of catalyst needed in the volume of spent catalyst particles, thereby also reducing operating costs.

Referring again to FIG. 1, method 10 continues by withdrawing the particulate solids from the vessel through the plurality of discharge openings and into the discrete pipes to the plurality of discrete withdrawal nozzles (step 18) and adding particulate solids to the vessel. The particulate solids may be withdrawn from the vessel for further processing after a selected contact or residence time. Particulate solids are added to the vessel to replenish the volume of particulate solids 101.

In an exemplary operation, referring again to FIG. 2, spent catalyst particles from a hydrocarbon conversion zone may be passed through a line (not shown) into the inlet 108 of the vessel. An elutriation fluid such as nitrogen may enter the upper portion of the vessel through a conduit at a rate that separates broken or chipped catalyst particles and catalyst fines from the whole catalyst particles. The catalyst chips and fines exit through another line (not shown) for collection. The whole spent catalyst particles flow downwardly in essentially dense phase flow with continuous or intermittent flow of the spent catalyst particles from the upper portion to the contacting zone in the lower portion of the vessel. The contacting zone in the lower portion of the vessel may be used to remove halogen-containing material from regeneration vent gas (the "fluid stream") rejected or vented from a catalyst regeneration zone. As used herein, "halogen-containing material" can include a halogen molecule, such as chlorine or fluorine, or a compound containing one or more independent halogen radicals. Examples of a halogen-containing material can include chlorine, fluorine, and hydrogen chloride. As known in the art, at least a portion of the regeneration vent gas may be passed into the volume of spent catalyst particles in the contacting zone 109 to sorb at least a portion of the halogen-containing material in at least a portion of the regeneration vent gas stream on the spent catalyst particles maintained in the lower vessel portion at sorption conditions to produce halogen-rich spent catalyst particles having an increased content of halogen-containing material relative to the spent catalyst particles and a halogen-depleted gas stream that may then be withdrawn from the vessel through the gas outlet 134 after disengagement from the halogen-rich spent catalyst particles and discharged into the atmosphere. The concentration of halogen-containing material in the gas stream has a reduced concentration of halogen-containing material (hereinafter "halogen-depleted gas stream") relative to the regeneration vent gas stream and may be discharged into the atmosphere without significant environmental concern. After having sorbed halogen-containing material in the contacting zone, the halogen-rich spent catalyst particles are guided by the plurality of guide tents into the spaced-apart discharge openings, through the corresponding pipes and into the discrete withdrawal nozzles and passed to the regeneration zone of the catalyst regeneration system (not shown) with little or no plugging in the vessel and associated discrete withdrawal nozzles.

While an apparatus for contacting a fluid stream with particulate solids has been described, it is to be understood that the apparatus may be used to improve the flow of particulate solids therethrough to substantially eliminate non-flowing particulate solids, but without contacting a fluid stream with the particulate solids, i.e., there is no fluid stream undergoing processing but particulate solids are needed to be discharged through discrete discharge nozzles to feed to downstream equipment having multiple discrete inlet nozzles. The particulate solids flow through the vessel in the same manner as previously described, with the truncated conical baffle directing descending particulate solids away from the peripheral wall of the vessel toward the center of the volume of particulate solids and to an interior surface of the outer cone and the longitudinal guide surfaces. The longitudinal guide surfaces are oriented to guide the flow of the particulate solids into adjacent spaced-apart discharge openings 132 in the annular ring 124 and into the plurality of discrete withdrawal nozzles 133 through corresponding discharge pipes 116.

From the foregoing, it is to be appreciated that the improved method and apparatus for contacting a fluid stream with particulate solids improves the flow of particulate solids and the distribution of fluid stream, substantially eliminating non-flowing particulate solids. In addition, the improved distribution of the fluid stream enables a reduction in vessel tangent length resulting in a shorter vessel that is less costly, requiring fewer materials, less upfront costs to operate, easier insulation, and is more space-efficient. In addition, the reduced tangent length reduces the overall volume of the vessel thus reducing the amount of particulate solids needed, thereby also reducing operating costs.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An apparatus for contacting a fluid stream with particulate solids having a shear angle, the apparatus comprising:
a vessel having an upper portion and a lower portion and an inlet for receiving particulate solids and an outlet for discharging the particulate solids;
an inner cone coaxially positioned within an inverted truncated outer cone forming an annulus in the lower portion of the vessel;
a truncated conical baffle disposed within the lower portion of the vessel and at least partially above the inverted truncated outer cone and the inner cone and having a downwardly and inwardly sloping wall with a lower portion thereof overlapping interiorly an upper portion of the inverted truncated outer cone; and
a plurality of guide tents spaced apart in the annulus, each guide tent having sloped guide surfaces oriented to guide the flow of particulate solids into the outlet.

2. The apparatus of claim 1, wherein a slope angle of each of the inner cone, the inverted truncated outer cone, the truncated conical baffle, and the sloped guide surfaces of each guide tent is equal to or less than the shear angle of the particulate solids.

3. The apparatus of claim 2, wherein the shear angle of the particulate solids comprises 20 degrees and the slope angle of each of the inner cone, the inverted truncated outer cone, the truncated conical baffle, and the slope guide surfaces comprises 20 degrees to vertical.

4. The apparatus of claim 1, wherein an end of each of the plurality of guide tents is contoured to follow a contour of the inverted truncated outer cone and an opposing end of each of the plurality of guide tents is contoured to follow a contour of the inner cone.

5. The apparatus of claim 1, wherein the truncated conical baffle is secured at an upper end to a peripheral wall of the vessel in the lower portion of the vessel.

6. The apparatus of claim 1, wherein the inner cone and the inverted truncated outer cone are coaxially supported on an annular ring overlying a bottom head of the vessel.

7. The apparatus of claim 6, wherein the outlet comprises a plurality of spaced-apart discharge openings in the annular ring, the discharge openings communicating with a plurality of discharge pipes extending through the bottom head of the vessel, each discharge pipe of the plurality of discharge pipes communicating with a corresponding discrete discharge nozzle of a plurality of discrete withdrawal nozzles.

8. The apparatus of claim 7, wherein each of the spaced-apart discharge openings of the plurality of spaced-apart discharge openings are adapted to receive particulate solids from one of the sloped guide surfaces of adjacent guide tents of the plurality of guide tents.

9. The apparatus of claim 7 further comprising a plurality of discrete withdrawal nozzles located externally of the apparatus
wherein the outlet communicates with the plurality of discrete withdrawal nozzles;
and wherein the annulus is formed between the inner cone and the truncated outer cone, with the inner cone tapering outwardly and downwardly and the truncated outer cone tapering inwardly and downwardly;
and wherein the truncated conical baffle is secured at an upper end to a wall of the vessel inside the lower portion of the vessel,
and wherein the guides surfaces are longitudinal guide surfaces;
the apparatus further comprising a fluid stream inlet line for admitting the fluid stream into a contacting zone between the truncated conical baffle and the truncated outer cone; and
wherein a slope angle of each of the truncated outer cone, the inner cone, the truncated conical baffle, and the plurality of guide tents comprises an angle to vertical equal or less than the shear angle of the particulate solids.

10. The apparatus of claim 9, wherein the shear angle of the particulate solids comprises 20 degrees and the slope angle of each of the truncated outer cone, the inner cone, the truncated conical baffle, and the plurality of guide tents comprises 20 degrees to vertical.

11. The apparatus of claim 9, wherein the longitudinal guide surfaces of each guide tent have an end contoured to follow a contour of the truncated outer cone and an opposing end contoured to follow the contour of the inner cone.

12. The apparatus of claim 9, wherein the inner cone and the truncated outer cone are coaxially supported on an annular ring overlying a bottom head of the vessel.

13. The apparatus of claim 12, wherein the outlet comprises a plurality of discharge pipes extending through the bottom head of the vessel, each discharge pipe of the plurality of discharge pipes adapted to receive particulate solids from one of the longitudinal guide surfaces of each guide tent and communicating with a corresponding discrete discharge nozzle of the plurality of discrete discharge nozzles.

14. The apparatus of claim 13, wherein the annular ring includes a plurality of spaced-apart discharge openings communicating with the plurality of discharge pipes.

15. A method for contacting a fluid stream with particulate solids having a shear angle, the method comprising the steps of:
passing particulate solids into a disengaging vessel containing, within a lower vessel portion:
a volume of particulate solids;
an inner cone coaxially positioned within an inverted truncated outer cone forming an annulus;
a truncated conical baffle at least partially above the inverted truncated outer cone and the inner cone and having a downwardly and inwardly sloping wall with a lower portion thereof overlapping interiorly an upper portion of the inverted truncated outer cone; and
a plurality of guide tents spaced apart in the annulus, each guide tent having guide surfaces to guide the flow of the particulate solids into adjacent discrete withdrawal nozzles of a plurality of discrete discharge nozzles;
passing the fluid stream at process conditions into the lower vessel portion for introduction into the volume of particulate solids between the conical baffle and the inverted truncated outer cone; and
withdrawing the particulate solids from the vessel through the plurality of discrete withdrawal nozzles.

16. The method of claim 15, wherein each of the inner cone, the inverted truncated outer cone, the truncated conical baffle, and the plurality of guide tents are each sloped at an angle to vertical that is equal to or less than the shear angle of the particulate solids.

17. The method of claim 15, wherein the step of passing the fluid stream at process conditions into the lower vessel portion comprises passing the fluid stream to contact the particulate solids in a contacting zone within the lower vessel portion.

18. The method of claim 15, wherein the step of passing the fluid stream at process conditions into the lower vessel portion comprises passing the fluid stream through a cross section smaller than the entire vessel cross section and toward the center of the vessel.

19. The method of claim 15, wherein the step of withdrawing the particulate solids from the vessel through the plurality of discrete withdrawal nozzles comprises guiding the particulate solids from the guide surfaces through discrete discharge pipes communicating with the discrete withdrawal nozzles.

20. The method of claim 19, wherein the discrete discharge pipes extend through a bottom head of the disengaging vessel, each discrete discharge pipe adapted to receive particulate solids from one of the guide surfaces of each guide tent.

* * * * *